INVENTOR.
WALTER W. JENKINS
BY Woodling, Krost, Granger and Rust
ATTORNEYS

Jan. 31, 1967 W. W. JENKINS 3,301,135
MILLING MECHANISM
Filed July 1, 1965 2 Sheets-Sheet 2

INVENTOR.
WALTER W. JENKINS
BY Woodling, Krost,
Granger and Rust
ATTORNEYS

United States Patent Office 3,301,135
Patented Jan. 31, 1967

3,301,135
MILLING MECHANISM
Walter W. Jenkins, Willowick, Ohio, assignor to The
National Acme Company, a corporation of Ohio
Filed July 1, 1965, Ser. No. 468,809
14 Claims. (Cl. 90—15)

The invention relates in general to a milling mechanism and more particularly to a milling mechanism on a machine to mill a portion of a workpiece with a variable depth cut on the workpiece.

Milling machines have been heretofore constructed wherein a milling cutter is moved laterally and a workpiece is moved longitudinally relative to the milling cutter. However, this limits the use to which the milling machine may be used. One use of the present invention is on a machine where a workpiece is stationary and the milling cutter or cutters move longitudinally and also move transversely at the same time to form a variable depth cut on the workpiece.

An object of the present invention is to provide a milling mechanism on a machine to have two directions of movement, one longitudinal and the other transverse for a variable depth of cut.

Another object of the invention is to provide a machine with two opposing milling cutters movable relative to each other for variable depth cuts as the cutters are moved along another axis.

Another object of the invention is to provide a machine with two different milling mechanisms, each of which provides variable depth cut on a workpiece at two different stations.

Another object of the invention is to provide a machine with two different milling mechanisms, each with two milling cutters movable relative to each other to mill two opposing grooves on a workpiece positioned in two different stations to form four grooves on the workpiece.

Another object of the invention is to provide a milling mechanism with milling cutters controlled by a stationary cam so as to have a variable depth of cut as the cutters are moved along a longitudinal axis.

The invention may be embodied in a milling mechanism on a machine comprising, in combination, a frame, a workholder carried on said frame and adapted to accept a workpiece, a movable member having a milling cutter mounted for movement thereon transversely relative to said path, means connected to rotate said milling cutter, a cam follower connected to said milling cutter, a cam carried on said frame having an axis along the length dimension thereof parallel to the direction of movement of the movable member, and said cam having a portion along the length thereof for cooperation with said cam follower with said portion having a variable transverse dimension from said cam axis at different places along the length of said cam, whereby said rotating milling cutter may operate on a workpiece by movement of said movable member.

Other objects and a fuller understanding of the invention may be had by referring to the following description and claims, taken in conjunction with the accompanying drawings, in which:

Figure 1:
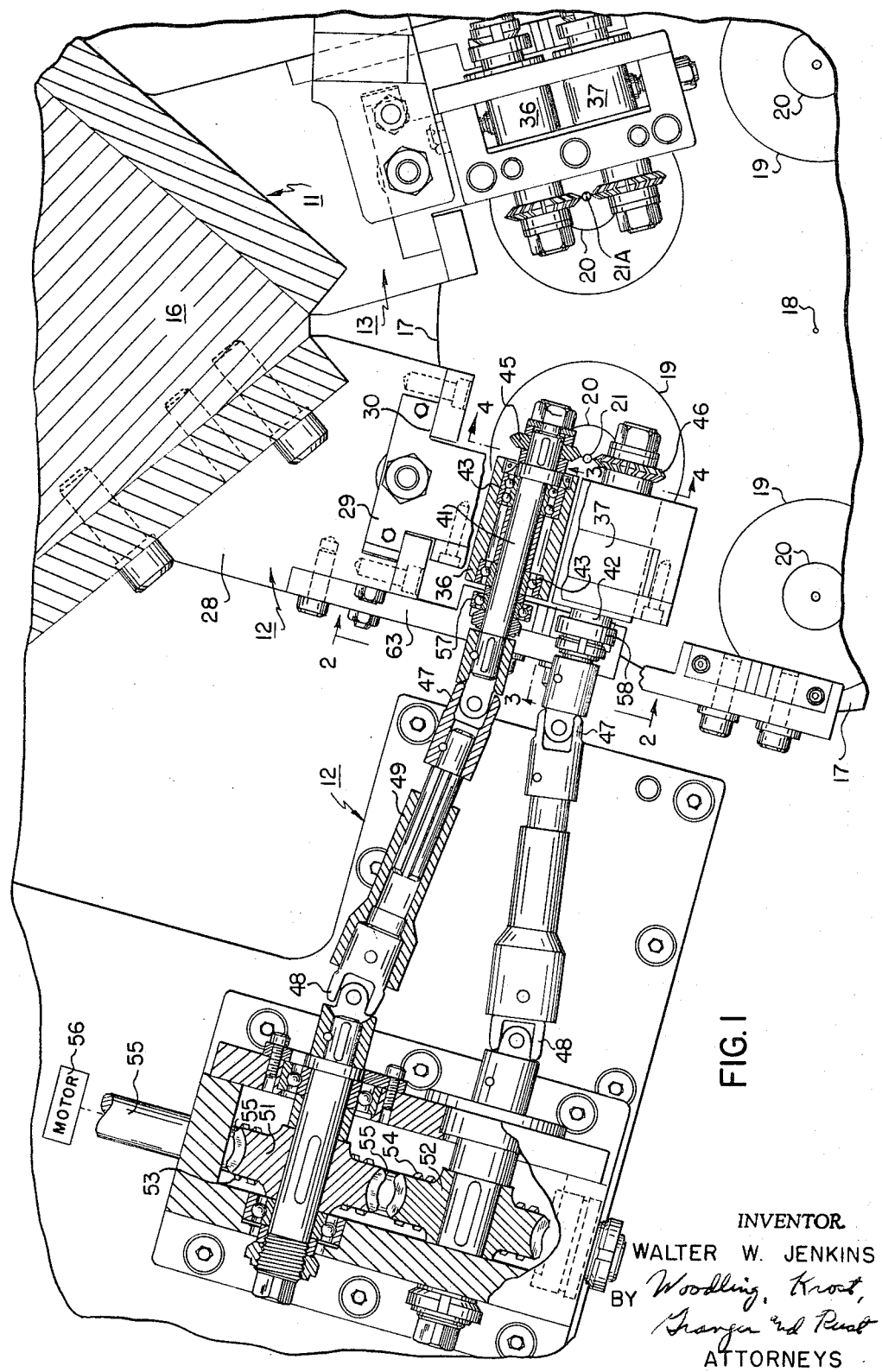
FIGURE 1 is a transverse cross-section of a machine embodying the invention.

The figures of the drawing show a machine 11 incorporating a milling mechanism 12 and a milling mechanism 13, which generally may be identical except with some reversed parts. The machine 11 is illustrated as a six spindle automatic machine having a frame 16 journalling a spindle carrier 17 about a longitudinal axis 18. This spindle carrier 17 is shown as having six revolvable spindles 19 journalled therein, each of which carries a chuck or collet 20 acting as a workholder to grip a workpiece 21. This machine may be the usual form of multiple spindle automatic bar or chucking machine wherein the spindles are driven from a motor 22 through a suitable drive train. This motor 22 also indexes the spindle carrier 17 into a plurality of positions, in this case six in number, so that the workpieces 21 may be operated on in the various positions of the spindle carrier by tools carried on the frame 16. The drive to the individual spindles preferably includes a clutch unit 23 and a brake unit 24 to alternatively provide rotation of the spindles 19 or braking action of the spindles to hold them stationary. The motor 22 also operates through an indexing mechanism, not shown, to index the spindle carrier 17 into the plurality of positions.

The milling mechanisms 12 and 13 are substantially identical except for reversal of some parts, and the same reference numerals will be applied to each, with mechanism 12 principally being described. The milling mechanism 12 includes a bracket 28 mounted fixedly on the upper portion of the frame 16. This bracket 28 movably supports a slide 29 which is slidable on ways 30 of the bracket 28 to be slidable parallel to the longitudinal axis 18 of the machine 11. The motor 22 drives a main cam drum 31 to provide many of the operating movements of the tooling of the machine 11 and a cam follower 32 is provided on this cam drum 31 and connected to the slide 29 by a linkage 33 which may be a pusher bar to provide reciprocation to this slide 29.

The slide 29 carries first and second levers 36 and 37 mounted on pivots 38 and 39, respectively, near the center of each lever. These two pivots 38 and 39 are parallel and disposed in a plane perpendicular to the longitudinal axis 18. Cutter shafts 41 and 42 are journalled in bearings 43 in one end of each of the levers 36 and 37. The cutter shafts 41 and 42 are disposed parallel and in a plane perpendicular to the longitudinal axis 18. Milling cutters 45 and 46 are fixedly carried on the cutter shafts 41 and 42, respectively. These milling cutters are disposed diametrically opposite and disposed to cut longitudinal grooves parallel to the longitudinal axis 18 in a workpiece 21 in a first spindle position of spindle carrier 17.

The cutter shafts 41 and 42 are connected by universal joints 47 and 48 and a splined connection 49 to worm wheels 51 and 52. These worm wheels are driven from opposite hand worms 53 and 54, respectively, on a shaft 55. This shaft is driven from a motor 56. Accordingly, this motor 56 provides rotation for the milling cutters 45 and 46 in opposite rotational directions.

Roller bearing cam followers 57 and 58 are carried on the cutter shafts 41 and 42, respectively. These are outboard of the bearings 43 and are adjacent the respective levers on the side opposite the milling cutters. Compression springs 59 are carried in pockets 60 in the levers 36 and 37 and act against the slide 29. These springs 59 urge the milling cutters 45 and 46 toward each other and accordingly each milling cutter is urged toward the workpiece 21. Adjustable stops 61 are carried on the slide 29 and act on the outer ends of the levers 36 and 37. These stops control the closest spacing of the milling cutters as urged together by the springs 59.

Figure 2:
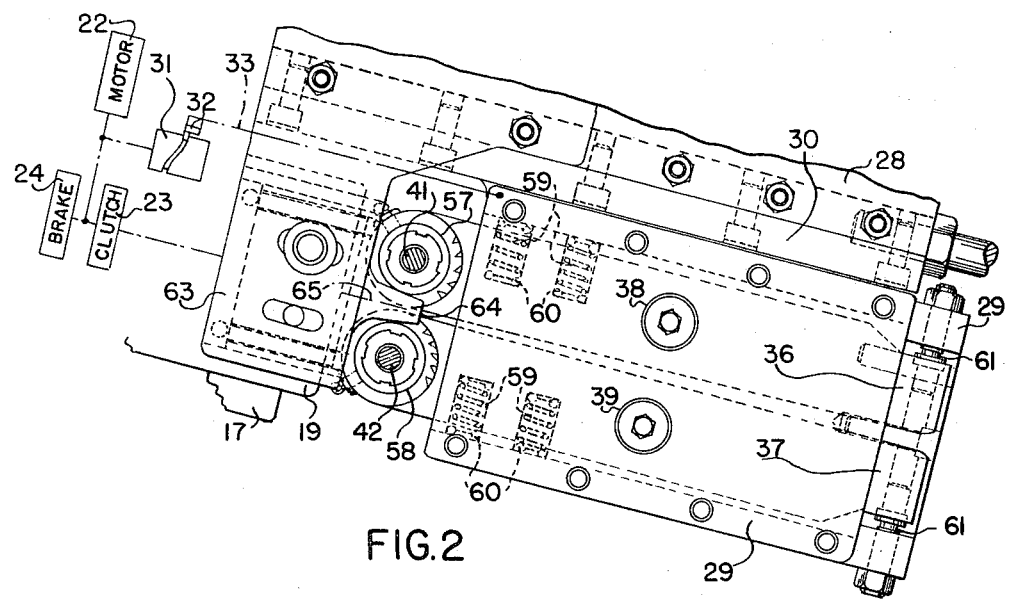
FIGURE 2 is a longitudinal sectional view of line 2—2 of FIGURE 1.

A fixed cam 64 is carried on a plate 63 fixed on the frame just outside the spindle carrier 17 for cooperation with the cam followers 57 and 58. This fixed cam has a longitudinal axis 65 parallel to the axis 18 of the machine. As best shown in FIGURE 2, this fixed cam is tapered across the width thereof, which means that it has a variable transverse dimension on each side relative to the longitudinal axis 65.

Figure 4:
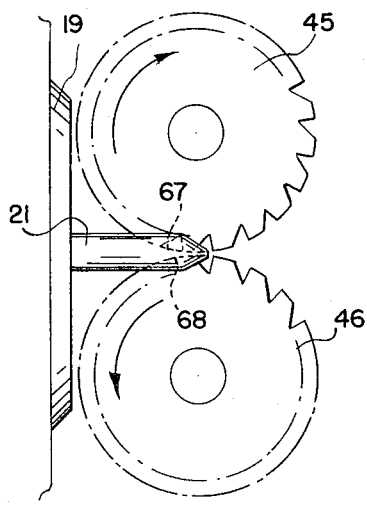
FIGURE 4 is an enlarged fragmentary view of milling cutters operating on a workpiece taken generally along the line 4—4 of FIGURE 1.
Figure 3:
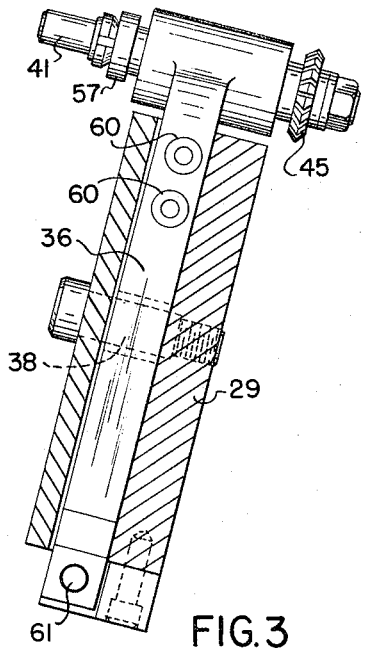
FIGURE 3 is a sectional view of line 3—3 of FIGURE 1.

FIGURE 4 is an enlarged partial view illustrating the milling cutters 45 and 46 milling diametrically opposite grooves in a workpiece 21. These grooves may form the slots of a Phillips type screw driver bit. The typical Phillips type screw driver bit has four slots or grooves longitudinal to the axis of the screw driver and disposed at 90 degrees around the periphery of the end of the screw driver bit. This is one use for the milling mechanisms of this invention.

Operation

The multiple spindle automatic machine 11 is shown as having six spindles 19 in a spindle carrier 17. The upper two positions will be termed first and second positions at which the milling mechanisms 12 and 13 are respectively positioned. At other spindle positions, other work operations may be performed by other tooling, not shown. At this first spindle position two diametrically opposite slots or grooves are milled by mechanism 12 in the workpiece 21. This may be the Phillips type screw driver bit as shown in FIGURE 4. The motor 56 drives the milling cutters 45 and 46 at a relatively high rate of speed, relative to the speed of traverse of the slide 29. This slide 29 is driven from the motor 22 and cam follower 32 to move longitudinally, parallel to the machine axis 18. The motor 22 also drives the spindles 19 through the clutch 23. In the first and second spindle positions of the spindle carrier 17, the clutch 23 is disengaged and the brake 24 engaged to stop the spindles in these two positions. With the spindle stopped, the slide 29 moves to the left, as viewed in FIGURE 2. As it moves to the left, the cam followers 57 and 58 are forced apart against the urging of the springs 59. This forces the cutter shafts 41 and 42 apart and the milling cutters 45 and 46 cut variable depth or tapered grooves 67 and 68, respectively, in the end of the workpiece 21. Next the cam drum 31 retracts the slide 29 to the right, as viewed in FIGURE 2. This removes the milling cutters 45 and 46 from engagement with the workpiece 21. Next the spindle carrier 17 is indexed, by 60 degrees in this case of a six spindle machine. FIGURE 1 shows this partly machined workpiece 21A in the second spindle position for operation thereon by the second milling mechanism 13. This milling mechanism is next operated in a manner similar to that described above. The milling cutters thereon will then mill two additional variable depth or tapered grooves on the workpiece 21A to thus have four equally spaced grooves on this workpiece. It will be noted that each slide 29 on the respective milling mechanisms 12 and 13 are disposed at a 15-degree angle relative to a vertical plane through the axis 18. This makes a total included angle of 30 degrees between these two slides. Accordingly, with the 60-degree arcuate movement of the workpiece 21A concomitant with the 60-degree indexing of the spindle carrier 17, this establishes that the new grooves cut by the milling mechanism 13 in the second spindle position will be 90 degrees from those grooves milled by the milling mechanism 12 in the first spindle position. The cam 31 next causes the slide of the milling mechanism 13 to retract from engagement with this completed workpiece so that the spindle carrier 17 may again index to another position.

The slides 29 may be characterized as movable members moving along a path parallel to the axis 18. Also it will be seen that the cutter shafts 41 and 42, by reason of their mounting on the levers 36 and 37, move transversely to and generally perpendicular to this path of movement to the slide 29.

The tapered sides of the cam 64 illustrate one form of cam having a variable transverse dimension along the length thereof to control the depth of a milled groove or milled portion on a workpiece.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A milling mechanism on a machine comprising, in combination, a frame,
   a workholder carried on said frame and adapted to accept a workpiece,
   a movable member movably carried on said frame for movement along a path,
   said movable member having first and second milling cutters relative movable thereon transversely to said path,
   means connected to rotate said milling cutters,
   a cam follower connected to each milling cutter,
   a cam carried on said frame having an axis along the length dimension thereof parallel to the direction of movement of the movable member,
   and said cam having portions along the length thereof for cooperation with the two cam followers with said portions having a variable transverse dimension from said cam axis at different places along the length of each said cam, whereby said rotating milling cutters may operate on a workpiece by movement of said movable member.

2. A milling mechanism on a machine comprising, in combination, a frame having an axis;
   a carrier journalled on said frame for indexing movements about said axis into first and second positions;
   at least first and second workholders on said carrier and each adapted to accept a workpiece;
   first and second movable members carried on said frame for movement along first and second paths, respectively;
      each of said movable members having first and second milling cutters relatively movable thereon transversely to the respective path,
      means connected to rotate said milling cutters,
      and a cam follower connected to each milling cutter;
   first and second cams carried on said frame each having an axis along the length dimension thereof parallel to the direction of movement of the respective movable member;
   and each said cam having sides along the length thereof for cooperation with the two cam followers with said sides having a variable transverse dimension from said cam axis at different places along the length of each said cam; whereby said milling cutters on said first movable member may operate on a workpiece in said first position of said carrier by movement of said first movable member and rotation of said milling cutters thereon, and whereby said milling cutters on said second movable member may operate on a workpiece in said second position of said carrier by movement of said second movable member and rotation of said milling cutters thereon.

3. A milling mechanism on a machine comprising, in combination, a frame having a longitudinal axis;
   a carrier journalled on said frame for indexing movements about said axis into first and second positions;

at least first and second workholders on said carrier and each adapted to accept a workpiece;

first and second movable members carried on said frame;

means to drive said first and second movable members along first and second paths, respectively;

each of said movable members having first and second cutter shafts, means to movably carry said shafts on the respective movable member on axes disposed generally in a plane perpendicular to the path of movement of the respective movable member and movable transversely to the respective path, a milling cutter carried on each of said cutter shafts, the milling cutters on said shafts being disposed for cutting parallel to the direction of movement of the respective movable member and for cutting two portions on a workpiece in one of said first and second carrier positions, means connected to said cutter shafts to rotate said cutter shafts from said drive means, and a cam follower connected to each milling cutter;

first and second cams carried on said frame each having an axis along the length dimension thereof parallel to the direction of movement of the movable member;

and each said cam having sides along the length thereof for cooperation with the two cam followers with said sides having a variable transverse dimension from said cam axis at different places along the length of each said cam; whereby said milling cutters on said first movable member may operate on a workpiece in said first position of said carrier by movement of said first movable member and rotation of said milling cutters thereon, and whereby said milling cutters on said second movable member may operate on a workpiece in said second position of said carrier by movement of said second movable member and rotation of said milling cutters thereon.

4. A milling mechanism on a machine comprising, in combination, a frame having a longitudinal axis;

a carrier journalled on said frame for indexing movements about said axis into first and second positions;

at least first and second workholders on said carrier and each adapted to accept a workpiece;

first and second movable members carried on said frame;

means to drive said first and second movable members along first and second paths, respectively;

each of said movable members having first and second cutter shafts, means to movably carry said shafts on the respective movable member on parallel axes disposed in a plane generally perpendicular to the path of movement of the respective movable member, said cutter shafts being in pairs on each movable member, a milling cutter fixedly carried on each of said cutter shafts, the milling cutters on a pair of shafts being disposed for cutting generally parallel to the direction of movement of the respective movable member and for cutting two portions on generally opposite sides of a workpiece in one of said first and second carrier positions, means connected to said cutter shafts to rotate said cutter shafts from said drive means, a cam follower mounted on each cutter shaft, and spring means urging said cutter shafts together;

first and second fixed cams carried on said frame disposed to cooperate with said pairs of cam followers on said first and second movable members, respectively, and each having an axis along the length dimension thereof parallel to the direction of movement of the respective movable member;

and each said cam having sides along the length thereof for cooperation with the two cam followers with said sides having a variable transverse dimension from said cam axis at different places along the length of each said cam; whereby said milling cutters on said first movable member may operate on a workpiece in said first position of said carrier by movement of said first movable member and rotation of said milling cutters thereon to cut two variable depth portions on the workpiece, and whereby said milling cutters on said second movable member may operate on a workpiece in said second position of said carrier by movement of said second movable member and rotation of said milling cutters thereon to cut two additional variable depth portions on the workpiece.

5. A milling mechanism on a machine comprising, in combination, a frame having a longitudinal axis, a workholder carried on said frame parallel to said axis, a slide movably carried on said frame, means to drive said slide, said slide having first and second levers pivoted thereon on parallel axes in a plane perpendicular to the direction of movement of said slide, a cutter shaft journalled in one end of each of said levers with said cutter shafts being parallel and disposed in a plane perpendicular to the direction of movement of said slide, said cutter shafts being in pairs on said slide, a milling cutter fixedly carried on each of said cutter shafts, the milling cutters on a pair of shafts being disposed for cutting parallel to the direction of movement of said slide and for cutting two grooves on generally opposite sides of a workpiece in said workholder, means connected to said cutter shafts to rotate said cutter shafts from said drive means at a high speed relative to the traverse of said slide, a roller bearing cam follower mounted on each cutter shaft, spring means urging said cutter shaft ends of said levers together, a fixed cam carried on said frame disposed to cooperate with said cam follower on said slide and having a length dimension parallel to the direction of movement of said slide.

and said cam having oppositely tapering sides along the length thereof, whereby said milling cutters on said slide may operate on a stationary workpiece in said workholder by movement of said slide and rotation of said milling cutters thereon to cut two tapered grooves in the workpiece.

6. A milling mechanism on a machine comprising, in combination, a frame having a longitudinal axis;

a carrier journalled on said frame for indexing movements about said axis into first and second positions;

at least first and second workholders on said carrier and each adapted to accept a workpiece;

first and second slides movably carried on said frame;

means to drive said slides;

each of said slides having first and second cutter shafts, means to movably carry said shafts on the respective slide on parallel axes in a plane generally perpendicular to the direction of movement of the respective slide, said cutter shafts being in pairs on each slide, a milling cutter fixedly carried on each of said cutter shafts, the milling cutters on a pair of shafts being disposed for cutting parallel to the direction of movement of the respective slide and for cutting two grooves on generally opposite sides of a workpiece in one of said first and second carrier positions,
means connected to said cutter shafts to rotate said cutter shafts from said drive means,
a cam follower mounted on each cutter shaft,
and spring means urging said cutter shafts together;

first and second fixed cams carried on said frame disposed to cooperate with said pairs of cam followers on said first and second slides, respectively, and each having an axis along the length dimension thereof parallel to the direction of movement of the respective slide;

and each said cam having sides along the length thereof for cooperation with the two cam followers with said sides having a variable transverse dimension from said cam axis at different places along the length of each said cam; whereby said milling cutters on said first slide may operate on a workpiece in said first position of said carrier by movement of said first slide and rotation of said milling cutters thereon to cut two variable depth grooves in the workpiece, and whereby said milling cutters on said second slide may operate on a workpiece in said second position of said carrier by movement of said second slide and rotation of said milling cutters thereon to cut two additional variable depth grooves on the workpiece.

7. A milling mechanism on a machine comprising, in combination, a frame having a longitudinal axis;
a carrier journalled on said frame for indexing movements about said axis into first and second positions;
at least first and second workholders on said carrier and each adapted to accept a workpiece;
a first and second movable members carried on said frame;
means to drive said first and second movable members along first and second paths, respectively;
each of said movable members having first and second levers pivoted thereon on parallel axes in a plane generally perpendicular to the path of movement of the respective movable member,
a cutter shaft journalled in one end of each of said levers with said cutter shafts being parallel and disposed in a plane generally perpendicular to the path of movement of the respective movable member,
said cutter shafts being in pairs on each movable member,
a milling cutter fixedly carried on each of said cutter shafts,
the milling cutters on a pair of shafts being disposed for cutting generally parallel to the path of movement of the respective movable member and for cutting two grooves on generally opposite sides of a workpiece in one of said first and second carrier positions,
means connected to said cutter shafts to rotate said cutter shafts from said drive means,
a cam follower mounted on each cutter shaft,
and spring means urging said cutter shaft ends of said levers together;

first and second fixed cams carried on said frame disposed to cooperate with said pairs of cam followers on said first and second movable members, respectively, and each having an axis along the length dimension thereof parallel to the path of movement of the respective movable member;

and each said cam having opposite sides along the length thereof for cooperation with the two cam followers with said sides having a variable transverse dimension from said cam axis at different places along the length of each said cam; thereby said milling cutters on said first movable member may operate on a stationary workpiece in said first position of said carrier by movement of said first movable member and rotation of said milling cutters thereon to cut two variable depth grooves in the workpiece, and whereby said milling cutters on said second movable member may operate on a stationary workpiece in said second position of said carrier by movement of said second movable member and rotation of said milling cutters thereon to cut two additional variable depth grooves on the workpiece.

8. A milling mechanism on a machine comprising, in combination, a frame having a longitudinal axis;
a carrier journalled on said frame for indexing movements about said axis into first and second positions;
at least first and second workholders on said carrier disposed parallel to said axis;
first and second slides movably carried on said frame;
means to drive said slides;
each of said slides having a lever pivoted thereon on an axis in a plane perpendicular to the direction of movement of the respective slide,
a cutter shaft journalled in one end of said lever with said cutter shaft disposed in a plane perpendicular to the direction of movement of said slide,
a milling cutter fixedly carried on said cutter shaft and disposed for cutting along a line parallel to the direction of movement of the respective slide and for cutting a groove on a workpiece in one of said first and second carrier positions,
means connected to said cutter shaft to rotate said cutter shaft from said drive means at a high speed relative to the traverse of said slides,
a roller bearing cam follower mounted on each said cutter shaft,
and spring means urging said cutter shaft end of said lever toward the workholder in the respective first and second carrier positions;

first and second fixed cams carried on said frame disposed to cooperate with said cam followers on said first and second slides, respectively;

and each said cam having a tapering side along the length thereof, whereby said milling cutter on said first slide may operate on a workpiece in said first position of said carrier by movement of said first slide and rotation of said milling cutter thereon to cut a tapered groove in the workpiece, and whereby said milling cutter on said second slide may operate on a workpiece in said second position of said carrier by movement of said second slide and rotation of said milling cutter thereon to cut an additional tapered groove disposed on a different portion of the periphery of the workpiece from the first-mentioned tapered groove.

9. A milling mechanism on a machine comprising, in combination, a frame having a longitudinal axis;
a carrier journalled on said frame for indexing movements about said axis into first and second positions;
at least first and second workholders on said carrier disposed parallel to said axis;
first and second slides movably carried on said frame;
means to drive said slides;
each of said slides having first and second levers pivoted thereon on parallel axes in a plane perpendicular to the direction of movement of the respective slide,
a cutter shaft journalled in one end of each of said levers with said cutter shafts being parallel and disposed in a plane perpendicular to the direction of movement of the respective slide,
said cutter shafts being in pairs on each slide,
a milling cutter fixedly carried on each of said cutter shafts, the milling cutters on a pair of shafts being disposed for cutting parallel to the direction of movement of the respective slide and for cutting two grooves on generally opposite sides of a workpiece in one of said first and second carrier positions, means connnected to said cutter shafts to rotate said cutter shafts from said drive means at a high speed relative to the traverse of said slides, a roller bearing cam follower mounted on each cutter shaft, and spring means urging said cutter shaft ends of said levers together;

first and second fixed cams carried on said frame disposed to cooperate with said pairs of cam followers on said first and second slides, respectively, and each having a length dimension parallel to the direction of movement of the respective slide;

and each said cam having oppositely tapering sides along the length thereof, whereby said milling cutters on said first slide may operate on a stationary workpiece in said first position of said carrier by movement of said first slide and rotation of said milling cutters thereon to cut two tapered grooves in the workpiece, and whereby said milling cutters on said second slide may operate on a stationary workpiece in said second position of said carrier by movement of said second slide and rotation of said milling cutters thereon to cut two additional tapered grooves disposed on a different portion of the periphery of the workpiece from the first-mentioned tapered grooves.

10. A milling mechanism on a machine comprising, in combination, a frame having a longitudinal axis;

a spindle carrier journalled on said frame for indexing movements about said axis into first and second positions;

at least first and second spindles on said spindle carrier rotatable parallel to said axis;

drive means to drive said spindles;

means to brake and hold stationary said spindles in said first and second spindle positions of said spindle carrier;

workholder means in each of said spindles to hold a workpiece parallel to said axis;

first and second slides movably carried on said frame;

cam means to drive said slides from said drive means;

each of said slides having first and second levers pivoted thereon on parallel axes in a plane perpendicular to the direction of movement of the respective slide, a cutter shaft journalled in one end of each of said levers with said cutter shafts being parallel and disposed in a plane perpendicular to the direction of movement of the respective slide, said cutter shafts being in pairs on each slide, a milling cutter fixedly carried on one end of each of said cutter shafts on one side of each said lever, the milling cutters on a pair of shafts being disposed generally in the same plane for cutting along a line parallel to the direction of movement of the respective slide and for cutting two opposing grooves on a workpiece in one of said first and second spindle positions, universal joint means connected to the opposite ends of said cutter shafts to rotate said cutter shafts from said drive means at a high speed relative to the traverse of said slides, a roller bearing cam follower mounted on each cutter shaft, and spring means urging said cutter shaft ends of said levers together;

first and second fixed cams carried on said frame disposed to cooperate with said pairs of cam followers on said first and second slides, respectively;

and each said cam having oppositely tapering sides along the length thereof, whereby said milling cutters on said first slide may operate on a stationary workpiece in said first spindle position by movement of said first slide and rotation of said milling cutters thereon to cut two tapered grooves in the workpiece, and whereby said milling cutters on said second slide may operate on a stationary workpiece in said second spindle position of said spindle carirer by movement of said second slide and rotation of said milling cutters thereon to cut two additional tapered grooves disposed on a different portion of the periphery of the workpiece from the first-mentioned tapered grooves.

11. A milling mechanism on a machine comprising, in combination, a frame having a longitudinal axis;

a spindle carrier journalled on said frame for indexing movements into a plurality of positions;

spindles on said spindle carrier equal in number to said plurality of positions and rotatable parallel to said axis;

drive means to drive said spindles;

means to brake and hold stationary said spindles in first and second spindle positions of said spindle carrier;

workholder means in said spindles to hold a workpiece parallel to said axis;

first and second slides carried on said frame for longitudinal movement parallel to said axis;

cam means to drive said slides in longitudinal movement from said drive means;

each of said slides having a lever pivoted thereon near the center of the lever on an axis in a plane perpendicular to said frame axis, a cutter shaft journalled in a bearing in one end of said lever with said cutter shaft disposed in a plane perpendicular to said frame axis, a milling cutter fixedly carried on one end of said cutter shaft on one side of said lever and disposed for cutting along a line parallel to said frame axis and for cutting a groove on a workpiece in one of said first and second spindle positions, universal joint means connected to the opposite end of said cutter shaft to rotate said cutter shaft from said drive means at a high speed relative to the traverse of said slides, a roller bearing cam follower mounted on each cutter shaft adjacent said lever on the side opposite said milling cutters, and spring means urging said cutter shaft end of lever toward the workpiece in the respective first and second spindle positions;

first and second fixed cams carried on said frame disposed to cooperate with said cam followers on said first and second slides, respectively;

each said cam having a longitudinal axis parallel to said frame axis;

and each said fixed cam having a tapering side along the longitudinal length thereof, whereby said milling cutter on said first slide may operate on a stationary workpiece in said first spindle position by longitudinal movement of said first slide and rotation of said milling cutter thereon to cut a longitudinally tapered groove in the workpiece, and whereby said milling cutter on said second slide may operate on a stationary workpiece in said second spindle position of said spindle carrier by longitudinal movement of said second slide and rotation of said milling cutter thereon to cut an additional longitudinally tapered groove disposed on a different portion of the periphery of the workpiece.

12. A variable depth milling machine comprising, in combination, a frame,
workholder means to hold a workpiece stationary on said frame,
a slide carried on said frame for movement parallel to an axis,
a motor to drive said slide in longitudinal movement,
a lever pivoted near the center thereof on said slide on an axis in a plane perpendicular to said frame axis,
a spindle journalled in one end of said lever with said spindle being in a plane perpendicular to said frame axis,
spring means urging said spindle end of said lever toward said workholder,
a milling cutter carried on said spindle with the milling cutter disposed in a plane for cutting along a line parallel to said frame axis,
means to rotate said spindle from said motor,
a roller bearing cam follower mounted on said spindle adjacent the bearing thereof in said lever,
a fixed cam carried on said frame disposed to cooperate with said cam follower and having an axis parallel to said machine frame axis,
said fixed cam having a taper along the longitudinal length thereof whereby said milling cutter may operate on a stationary workpiece by longitudinal movement of said slide and rotation of said milling cutter to cut a tapered groove in the workpiece.

13. A variable depth milling machine comprising, in combination, a frame having an axis,
workholder means to hold a workpiece stationary on said frame parallel to said axis,
a slide carried on said frame for longitudinal movement parallel to said axis,
a motor to drive said slide in longitudinal movement,
first and second levers pivoted near the center thereof on parallel axes on said slide with said levers being generally parallel,
a spindle journalled in one end of each of said levers with said spindles being parallel and in a plane perpendicular to said axis,
said spindles being at the same end of said levers,
spring means urging said spindle ends of said levers together,
a milling cutter fixedly carried on each of said spindles with the two milling cutters disposed in generally the same plane for cutting along a line parallel to said axis,
means to rotate said spindles from said motor at a high rate of speed relative to the traverse of said slide,
a roller bearing cam follower mounted on each spindle adjacent the bearing thereof in the respective lever,
a fixed cam carried on said frame disposed to cooperate with said two cam followers and having an axis parallel to said machine frame axis,
said fixed cam having a taper along the longitudinal length thereof whereby said milling cutters may operate in a stationary workpiece by longitudinal movement of said slide and rotation of said milling cutters to cut two tapered grooves in the workpiece.

14. A milling mechanism on a machine comprising, in combination, a frame having a longitudinal axis;
a spindle carrier journalled on said frame for indexing movements about said axis into a plurality of positions;
spindles on said spindle carrier equal in number to said plurality of positions and rotatable parallel to said axis;
drive means to drive said spindles;
means to brake and hold stationary said spindles in first and second positions of said spindle carrier;
workholder means in said spindles to hold a workpiece parallel to said axis;
first and second slides carried on said frame for longitudinal movement parallel to said axis;
cam means to drive said slides in longitudinal movement from said drive means;
each of said slides having first and second levers pivoted thereon near the center of the levers on parallel axes in a plane perpendicular to said frame axis,
a cutter shaft journalled in a bearing in one end of each of said levers with said cutter shafts being parallel and disposed in a plane perpendicular to said frame axis,
said cutter shafts being in pairs on each slide,
a milling cutter fixedly carried on one end of each of said cutter shafts on one side of each said lever,
the milling cutters on a pair of shafts being disposed generally in the same plane for cutting along a line parallel to said frame axis and for cutting two opposing grooves on a workpiece in one of said first and second spindle positions,
universal joint means connected to the opposite ends of said cutter shafts to rotate said cutter shafts from said drive means at a high speed relative to the traverse of said slides,
a roller bearing cam follower mounted on each cutter shaft adjacent said lever on the side opposite said milling cutters,
and spring means urging said cutter shaft ends of said levers together;
first and second fixed cams carried on said frame disposed to cooperate with said pairs of cam followers on said first and second slides, respectively;
each said cam having a longitudinal axis parallel to said frame axis;
and each said fixed cam having oppositely tapering sides along the longitudinal length thereof, whereby said milling cutters on said first slide may operate on a stationary workpiece in said first spindle position of said spindle carrier by longitudinal movement of said first slide and rotation of said milling cutters thereon to cut two longitudinally tapered grooves in the workpiece, and whereby said milling cutters on said second slide may operate on a stationary workpiece in said second spindle position of said spindle carrier by longitudinal movement of said second slide and rotation of said milling cutters thereon to cut in the workpiece two additional longitudinally tapered grooves disposed in a plane perpendicular to the plane of the first-mentioned tapered grooves.

References Cited by the Examiner

UNITED STATES PATENTS

| | | | |
|---|---|---|---|
| 554,796 | 2/1896 | Roberts | 90—15 |
| 2,645,978 | 7/1953 | Sejarto et al. | 90—13.05 |
| 2,675,742 | 4/1954 | Petre | 90—15 X |
| 3,164,851 | 1/1965 | Hanneman | 90—15.1 X |

WILLIAM W. DYER, Jr., *Primary Examiner.*

G. A. DOST, *Assistant Examiner.*